(12) United States Patent
Aaron

(10) Patent No.: US 7,738,898 B2
(45) Date of Patent: Jun. 15, 2010

(54) METHODS AND DEVICES FOR MOBILE COMMUNICATION DEVICE GROUP BEHAVIOR

(75) Inventor: Jeffrey Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 537 days.

(21) Appl. No.: 11/610,927

(22) Filed: Dec. 14, 2006

(65) Prior Publication Data

US 2008/0146212 A1 Jun. 19, 2008

(51) Int. Cl.
*H04B 7/00* (2006.01)

(52) U.S. Cl. ............... 455/519; 455/420; 455/419; 455/456.1

(58) Field of Classification Search ........... 455/518, 455/519, 418, 419, 420, 41.2, 456.1, 550.1, 455/567; 717/117; 379/202.1
See application file for complete search history.

(56) References Cited

U.S. PATENT DOCUMENTS

| | | | |
|---|---|---|---|
| 5,505,057 | A | 4/1996 | Sato et al. |
| 6,130,707 | A | 10/2000 | Koller et al. |
| 6,580,914 | B1 | 6/2003 | Smith |
| 6,587,835 | B1 | 7/2003 | Treyz et al. |
| 6,853,628 | B2 | 2/2005 | Chitrapu |
| 6,912,398 | B1 | 6/2005 | Domnity |
| 6,977,997 | B2 | 12/2005 | Shioda et al. |
| 7,136,658 | B2 | 11/2006 | Cole et al. |
| 7,324,959 | B2 | 1/2008 | Malkin et al. |
| 7,634,228 | B2 | 12/2009 | White et al. |
| 2002/0082931 | A1 | 6/2002 | Siegel et al. |
| 2003/0006913 | A1 | 1/2003 | Joyce |
| 2003/0008661 | A1 | 1/2003 | Joyce |
| 2004/0032503 | A1 | 2/2004 | Monden et al. |
| 2004/0082351 | A1 | 4/2004 | Westman |
| 2004/0141606 | A1* | 7/2004 | Torvinen ............ 379/202.01 |
| 2004/0209602 | A1 | 10/2004 | Joyce |
| 2005/0149443 | A1* | 7/2005 | Torvinen ............... 705/51 |
| 2005/0153729 | A1* | 7/2005 | Logan et al. ........... 455/550.1 |
| 2006/0033625 | A1 | 2/2006 | Johnson et al. |
| 2007/0037561 | A1* | 2/2007 | Bowen et al. ........... 455/418 |
| 2007/0037605 | A1* | 2/2007 | Logan ................. 455/567 |
| 2007/0054687 | A1 | 3/2007 | Akita et al. |
| 2007/0182818 | A1 | 8/2007 | Buehler |
| 2007/0232342 | A1 | 10/2007 | Larocca |
| 2008/0004951 | A1 | 1/2008 | Huang et al. |

(Continued)

OTHER PUBLICATIONS

U.S. Appl. No. 11/610,898, filed Dec. 14, 2006.

(Continued)

*Primary Examiner*—Tan Trinh
(74) *Attorney, Agent, or Firm*—Parks IP Law LLC; Mickki D. Murray, Esq.

(57) ABSTRACT

Mobile communications devices that are within a pre-defined group are controlled by rules specified for the group when those mobile communications devices are within a group setting. A group setting may be dictated by the location of the mobile communications devices of the group, their proximity to one another, a current time, and so forth. Once it is determined that the group setting exists, pre-defined rules specified for the mobile communications devices within the group setting are implemented to control behaviors of the mobile communications devices. Ringers may be muted, outbound calls may be disabled, inbound calls may be forwarded elsewhere, and so forth. The mobile communications devices then become less of a distraction to the group setting.

20 Claims, 5 Drawing Sheets

U.S. PATENT DOCUMENTS

2008/0182586 A1* 7/2008 Aaron ..................... 455/456.1
2009/0176524 A1 7/2009 David

OTHER PUBLICATIONS

U.S. Appl. No. 11/843,954, filed Aug. 23, 2007.
GPS Locator Phone, http://www.wherify.com/wherifone/kids.html?page-kids, copyright 2006, believed to exist before filing of the present application.
Dodgeball.com bringing your phone to life. http://www.dodgeball.com, copyright 2006, believed to exist before filing of the present application.
OnStar Technology, http://www.onstar.com/US_english/jsp/explore/onstar_basics/technology.jsp, copyright 2006, believed to exist before filing of the present application.
U.S. Appl. No. 11/611,345, filed Dec. 15, 2006.
U.S. Appl. No. 11/610,890, filed Dec. 14, 2006.
U.S. Appl. No. 11/680,898, filed Dec. 14, 2006.
U.S. Appl. No. 11/611,434, filed Dec. 15, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/668,848, filed Jan. 30, 2007.
U.S. Appl. No. 11/627,269, filed Jan. 25, 2007.
"Hello: GPS Cell Phone Enabled With Google Maps & Buddy Beacon", http://web.archive.org/web/20061205193736/www.helio.com/page?p=services_gps.

* cited by examiner

| GROUP ID | GROUP MEMBERS | PARAMETERS | RULES |
|---|---|---|---|
| 1234 | 123-035-6789<br>PRIMARY | PROXIMITY ≤ 50FT | 6789 - DISABLE OUTBOUND, MUTE RINGER, FORWARD TO 123-035-6780<br><br>6780 VIBRATE UNLESS 123-123-5678 |
| | 123-035-6780<br>PRIMARY | TIME = 12PM – 1PM, 6PM – 7PM, | 6789 – DISABLE OUTBOUND, MUTE RINGER<br><br>6780 – MUTE RINGER |
| | | LOCATION A | 6789 – DISABLE OUTBOUND, MUTE RINGER<br>6780 – DISABLE OUTBOUND, VIBRATE |
| 5678 | 123-146-9876<br>SECONDARY | PROXIMITY ≤ 100FT<br>TIME = 8AM – 5PM | 9876 – FORWARD TO VOICEMAIL<br><br>9870 – FORWARD TO VOICEMAIL<br><br>6789 – FORWARD TO VOICEMAIL |
| | 123-146-9870<br>PRIMARY<br><br>123-035-6789<br>SECONDARY | PROXIMITY ≤ 25FT | 9876 – FORWARD TO VOICEMAIL, DISABLE OUTBOUND<br><br>9870 – FORWARD TO VOICEMAIL<br><br>6789 – FORWARD TO VOICEMAIL, DISABLE OUTBOUND |

FIG. 4

METHODS AND DEVICES FOR MOBILE COMMUNICATION DEVICE GROUP BEHAVIOR

TECHNICAL FIELD

Embodiments are related to the behavior of mobile communications devices. More particularly, embodiments are related to the behavior of groupings of mobile communications devices.

BACKGROUND

Mobile communications devices such as cellular phones, PDAs, and the like have become a ubiquitous part of life. These devices allow the user to be able to communicate with others at virtually any time and any place. The convenience and benefits of such connectivity are without question. As a result, many families have more than one, and often even children carry a mobile communications device. Individuals of a business also typically carry a mobile communications device to allow them to conduct their business while on the go.

Unfortunately, such accessibility can have drawbacks. Users of mobile communications devices may find that they cannot escape incoming communications and/or may feel the need to make outgoing calls at any time regardless of the surrounding circumstances. This is particularly troublesome in group settings where members of the group need to interact with one another or are in close proximity and should not disturb one another. The incoming and outgoing calls via the mobile communications devices of the group can disrupt the group setting.

For example, a family may have a time designated for a meal during which the family is expected to interact while they eat. Some or all of the family may be gathered at a common group location and/or some may be located remotely but may be connected to the group location through a video conference, phone call, etc. However, incoming and/or outgoing calls via a mobile communications device of any one of the family members during the group setting become disruptive. When multiple members of the group experience incoming and/or outgoing calls during the group setting, then these multiple calls may completely frustrate the intended purpose of gathering into the group.

SUMMARY

Embodiments address these issues and others by providing a group control mode of operation for the mobile communications devices of the group. The group control mode may specify various rules for handling incoming and outgoing calls for the group. The rules may be the same for some mobile communications devices of the group while different for others. For example, the mobile communications device of a parent may handle calls differently than the mobile communications devices of the children. The rules may take effect on the basis of an occurrence of the group setting. The group setting may occur due to a specified time being reached, due to a collection of the group members being at a defined location, due to a gathering of the group members within a defined proximity relative to one another, and so forth.

Embodiments provide a method of applying rules to mobile communication devices. The method involves determining that a mobile communication device is within a defined group of mobile communication devices. Upon determining that the mobile communication device is within the defined group, at least one rule specified for the defined group of mobile communications devices is implemented for the mobile communications device.

Embodiments provide a computer readable medium containing instructions that perform acts that involve determining whether a parameter related to a mobile communications device falls within a threshold that defines a grouping of mobile communications devices. When the parameter falls within the threshold, then at least one rule defined for the group is implemented for the mobile communications device.

Embodiments further provide a mobile communications device that includes a transceiver for communicating with a mobile communications network. The mobile communications device also includes a memory storing rules for detecting when to implement actions to take in relation to calls based on at least one parameter defined for a group of mobile communications devices. A processor of the mobile communications device is configured to send and receive calls via the transceiver, to determine the parameter, and to implement the actions to take in relation to calls based on the determined parameter.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 4 shows an example of a database structure for specifying groups, group setting parameters, and rules of various control modes.

DETAILED DESCRIPTION

Embodiments provide for the control of mobile communications device activities in group settings by implementing rules across the group. Accordingly, the mobile communications devices may remain a significant tool in every day life while having less of an impact on group settings where the use of mobile communications devices should be limited to some degree.

Figure 1:
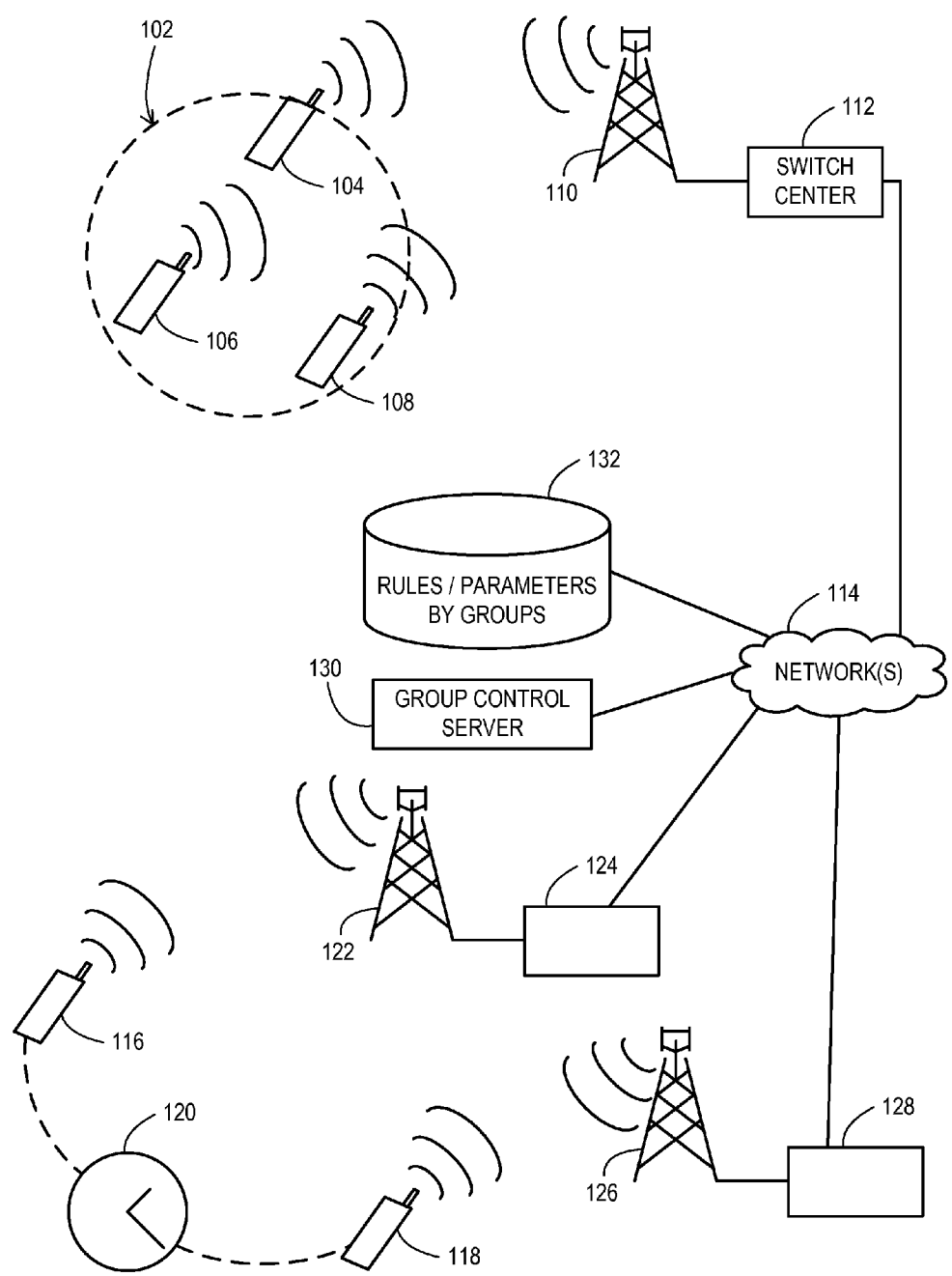
FIG. 1 shows an example of a mobile communications device in communication with a mobile communications network and/or other mobile communications devices to establish a group setting and related control modes.

FIG. 1 shows an example of groups where members have mobile communications devices subject to control by rules specified for the group. The mobile communications devices may be of any type such as cellular phones, PDAs, and the like. The mobile communications devices may be controlled on the basis of peer-to-peer communications or communications through a mobile communications network. Furthermore, a centralized point of control may be provided via the mobile communications network.

A first group of mobile communications devices 104, 106, 108 are grouped based on their proximity to one another and/or having a common location as indicated by perimeter 102. For example, this first group may be a family of three seated together for a meal. As another example, this first group may be co-workers within a conference room. These mobile communications devices 104, 106, 108 may be in direct communication via peer-to-peer short range communication or may be in communication via a base station 110 and switching center 112 of a mobile communication network. Furthermore, these mobile communications devices 104, 106, 108 may be in communication with a group control server 130 via a data network 114 that is interfaced to the mobile communications network.

A second group of mobile communications devices 116, 118 are grouped based on a current time as represented by clock 120 but may not be located closely together. For example, this second group may be a family of two but living or working at separate locations who interact with one another through a phone call, video conference, instant messaging, or other mode of communication during set periods of time. As another example, this second group may be co-workers located in different locales. This second group may be in communication via one or more base stations 122, 126 and switching centers 124, 128. Furthermore, these mobile communications device 116, 118 may also be in communication with the group control server 130 via the data network 114.

For each of these groups, the group control may be implemented as a function of a master device, as a function of the devices acting collectively, or as a function of the group control server 130. For example, where a master device is designated for the group, the master device may store the parameters that define whether the group setting exists and associates a set of rules for the devices of the group to the group setting. As another example, where the devices act collectively, each device may store the parameters that define the group setting and may store the associations of the rule sets pertinent to that device for the particular group setting that has been defined.

Likewise, where a group control server 130 implements a group setting control service subscribed to by the various groups, the server 130 may store the parameters that define the group setting, in association with the device IDs for each of the group members and with a set of rules for the group. The server 130 may maintain a database 132 that stores an identifier for each of the groups, identifiers for each of the group members, the parameters that define the group setting, and the rules to implement for the various mobile devices when in the group setting.

Figure 2:
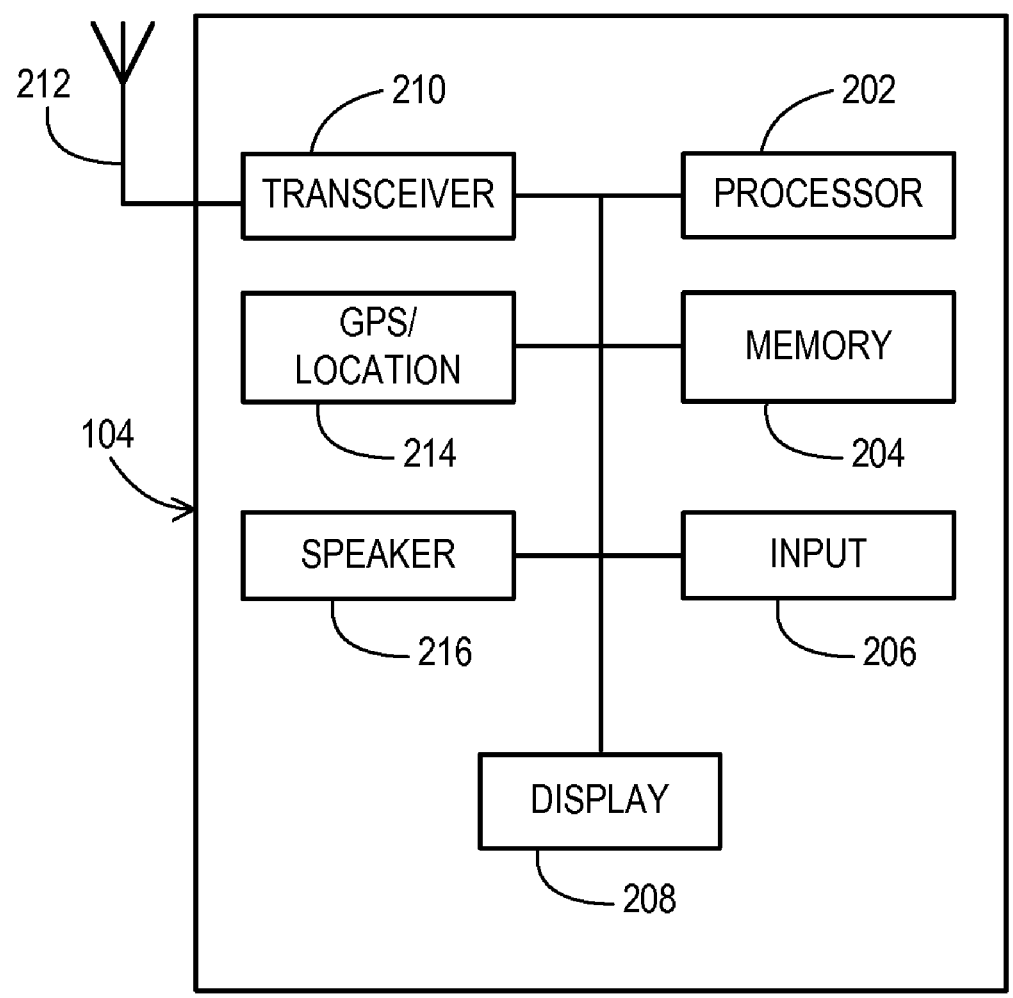
FIG. 2 shows one example of a mobile communications device.

FIG. 2 shows the components of one example of the mobile communications device 104 for implementing the rules specified for the group. The mobile communications device 104 includes a processor 202, a memory 204, input device(s) 206, and output device(s) such as a display device 208 or other output such as an audio speaker 216. The mobile communications device 104 also includes a transceiver 210 with an antenna 212 for communicating with a wireless endpoint such as a cellular base station and/or directly via peer-to-peer communications with other mobile communications devices. Additionally, the mobile communications device 104 may include a location device 214, such as a geonavigational positioning system (GPS) receiver, a cellular signal triangulation receiver, and the like which detects the physical location of the mobile communications device 104 at virtually all times.

The processor 202 performs actions based on instructions either hard coded into the processor 202 or stored in the memory 204. An example of the logical operations performed is discussed below in relation to FIG. 5. The processor 202 may be a dedicated/special purpose processor or a general purpose programmable processor or some combination. The memory 204 may be volatile memory, non-volatile memory, or a combination thereof. The processor 202 and/or memory 204 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The memory 204 may store the set of parameters that defines the group setting and the rules to be implemented. In the case of a master device, the memory 204 may store the rules to be implemented for each of the devices of the group. The memory 204 may further store instructions for communicating with the group control server 132 and/or other devices of the group(s) for which the mobile communications device 104 is a member.

The input device 206 may include a keypad, keyboard, touchscreen, voice recognized input, and so forth. The input device 206 provides data to the processor 202 which acts upon the input to perform requested tasks. The input device 206 may be used to manually initiate a group setting control, to override group setting rules when the mobile communications device 104 has such authority for the group, and so forth.

The display device 208 may provide an interface allowing the user to make selections during the period of group control. The selections, for example, may be to initiate or cancel the group setting controls including the rules being applied to the mobile communications device 104 and/or the rules being applied to other devices of the group.

Figure 3:
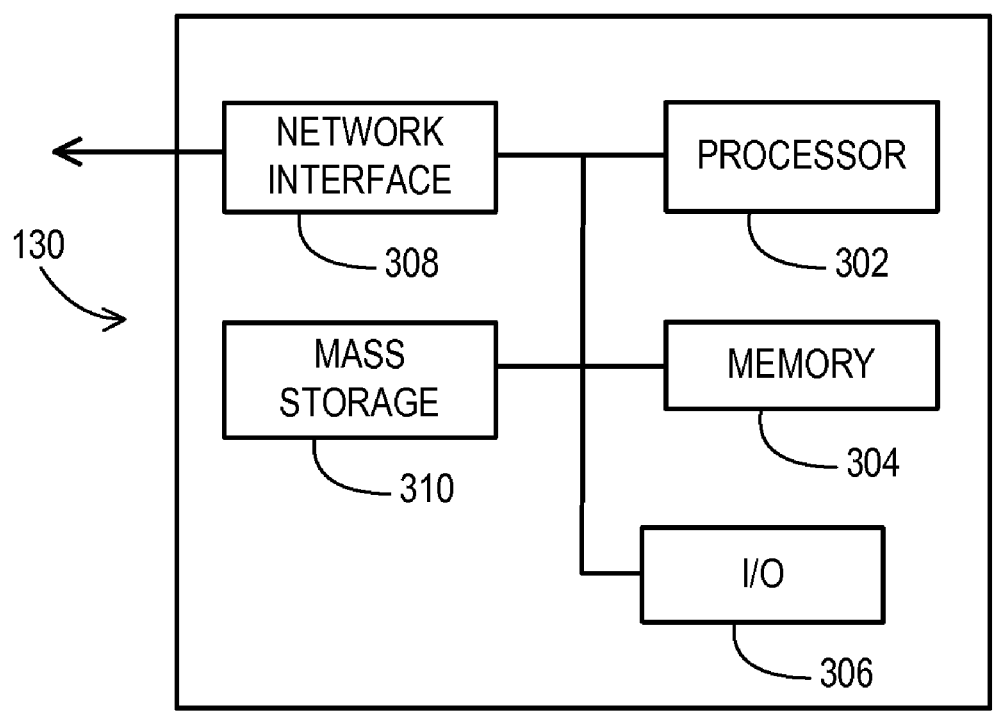
FIG. 3 shows one example of a group control server.

FIG. 3 shows components of an example of the group control server 130. The control server 130 may include the standard components of a server computer including a processor 302, memory 304, input/output devices 306, mass storage 310, and a network interface 308. The processor 302 communicates with external devices including mobile communication device 104 via the network interface 308. The processor 302 determines when the group setting exists based on the parameters stored for the group and submits commands to the mobile communications devices based on the rules specified for each one. Examples of the logical operations performed by the processor are also discussed below in relation to FIG. 5.

The memory 304 may be volatile or non-volatile or a combination thereof and may store instructions to be performed by the processor 302 when providing the group control service. As discussed above in relation to the mobile communications device 104, the processor 302 and the memory 304 are examples of computer readable media.

The input/output 306 may be used for local operation and management of the group control server 116. The input/output 306 may include a keyboard, mouse, display, and the like.

The mass storage device 310 may contain applications such as an operating system and a group control service application. Thus, the processor 302 may access the storage device 310 when implementing the group control service. The mass storage device 310 is another example of a computer readable medium.

The database 132 of FIG. 1 may be contained within the mass storage device 310. As an alternative, the database 132 may be present as network storage, accessible via the network interface 308.

FIG. 4 shows on example of data maintained in a table 400 by the database 132 for purposes of implementing the group control service. The group control server 130 may access the data from the table 400 when detecting whether a group setting currently exists for a particular defined group and to implement the rules defined for the group across the mobile communications devices of the group.

In this example, the data is arranged in the table 400 so a group identifier in column 402 is associated with a mobile device identifier of each of the members of the group in column 404. Each group receiving the group control service is shown as a separate row 410, 412, and it can be seen that some mobile communications devices are members of multiple groups where the order of application is indicated as primary or secondary. The mobile communication device identifier of column 404 may be an electronic serial number, phone number, or other identifier unique to each of the mobile communications devices.

The table 400 further associates a set of parameters of column 406 with the group identifier of column 402. The set of parameters of column 406 define the group setting for which a set of control rules for the group apply. A given group may have multiple group settings specified in an order of application. The set of control rules are specified for each group setting of a group in column 408.

The parameters of column 406 may be based upon one or more factors including location related factors, time, and/or other detectable factors that may indicate a group setting. The location related parameters may include the proximity of one or more mobile communications devices to other mobile communications devices of the group. The location related parameters may include whether the mobile communications devices of the group are within a defined location. Other parameters that may be used to determine the group setting may include whether a current time falls within a specified span of time. These parameters may operate independently or in conjunction. Furthermore, in determining whether a group setting currently exists, the group control service may be configured so that fewer than all group members may match a parameter in order to conclude that a group setting does exist.

The rules as set forth in column 408 may specify one or more actions for a particular mobile communications device to implement and/or for the mobile communications network to implement for the mobile communications device. As shown, the rules include such actions as disabling the ability to generate outbound calls, muting the ringer, forwarding incoming calls to a particular phone number such as one of the mobile communications device of the group, forwarding to voicemail or a group voicemail account, and enabling a vibration ringer.

Note that "call" or "calls" as used herein can refer to any type of inbound or outbound communication, not just to traditional connection-oriented voice communications, and so may be considered in terms of virtually any application including packet data and data applications such as email, instant messaging, SMS (Short Message Service) messaging, other types of messaging, VoIP (Voice over Internet Protocol), alerts/alarms, RSS (Real Simple Syndication) updates, other types of updates, etc. Also, for applications other than voice communications a suitable repository may be used rather than a voicemail account. For instance, for instant messaging (IM), the appropriate repository might be a special folder the user could review later, or later be reminded to look at, because the user's mobile device did not buzz or otherwise alert when the instant message was received but instead remained silent and the IM message was redirected to the special folder. For maximum convenience, the special folder would not just be the IM inbox, but might be a specially-designated sub-folder of that inbox, and might even be separately instantiated and named with the specific time period so that the user could easily and separately locate redirected messages stored during different group gathers.

For rules where the action is taken directly by the mobile communications device, such as to mute the ringer, enable a vibration ringer, or even disable outbound calls, the group control server 130 may send a command directly to the particular mobile communication device via the mobile communication network. The mobile communications device may then act on the received command without any action being taken by the user.

For rules where the action is taken by the mobile communications network, such as switching center 112, the group control server 130 may send a command to the appropriate network component. Examples of such actions may include forwarding an incoming call to another number, forwarding to a voicemail account of the mobile communications device or a voicemail account for the group, or even disabling outbound calls. As the mobile communications network maintains awareness of which switching center and base station that the mobile communications devices are in communication with, the group control server 130 may rely on the mobile communications network's ability to find the appropriate switching center and/or base station equipment that may implement the rule for the mobile communications device of interest.

As a specific example of group control, the group 1234 includes two mobile communications devices and three different group settings. When the two devices are both within a 50 foot proximity of one another, then the 6789 device disables its outbound calling and mutes its ringer. Alternatively, the mobile communications network disables the outbound calling. Also, the mobile communications network forwards inbound calls to the other mobile communications device of the group. For example, the 6789 device may belong to a child while the 6780 device belongs to the parent. When the two are close together, then calls to the child go to the parent so that the parent may filter who is allowed to speak to the child at that time. The 6780 device sets its ringer to vibrate mode except for inbound calls from a specific number, such as the number of the other parent or a work number.

As another group setting for group 1234, they are determined to be a group during specific spans of time during the day, such as at the times when meals will be eaten. During those times, the 6789 device disables its outbound calls, or the network disables those outbound calls, and the device mutes the ringer. The 6780 device mutes its ringer.

As another group setting for group 1234, they are determined to be a group during periods when both devices are present at a specific location, like when at home. During those instances, the 6789 device or the network disables the outbound calls and mutes the ringer. The 6780 device disables outbound calls and sets its ringer to vibrate mode.

As another specific example, the group 5678 includes three mobile communications devices and two group settings. The group control server 130 may be configured to require all three devices to meet the same group setting parameter prior to engaging the rules or may be configured to require only two of the three devices to meet the same group setting parameter and then may implement the rules for only those two devices.

For instance, when the multiple devices are within 100 feet of one another during the specified time period, then all devices within that group setting forward to their voicemail. When the multiple devices are within 25 feet of one another, regardless of the time, then all devices within the group setting forward to their voicemail while 9876 and 6789 also disable outbound calls. The 9870 device remains capable of making outbound calls.

Regarding the three group settings for group 1234 and the two group settings for group 5678, the order of priority may be specified so that when the group settings overlap, the higher priority group setting is the one whose rules are implemented. For example, for the 5678 group, the top-most group setting of the table may be considered the highest priority while the bottom-most group setting is has the lowest priority. As an example, for group 5648, when multiple devices are within 25 feet of one another and the time does meet the time span shown, then the top group setting rules are applied. When the multiple devices are within 25 feet of one another and the time does not meet the time span shown, then the bottom group setting rules are applied.

Regarding the presence of the mobile communications device having the identifier 123-035-6789 appearing in both groups 1234 and 5678, the order of priority may be specified so that when the group settings overlap, the higher priority group is the one whose rules are implemented. For example, the 1234 group is specified as the primary group while the group 5678 is specified as the secondary group for this mobile communications device. One may be a family group while the other is a work group. As an example, should at least one group setting for group 1234 and at least one group setting for group 5678 that includes device 123-035-6789 simultaneously exist, then the 123-035-6789 device will follow the rule specified for group 1234 since that is the primary group for that device.

As discussed above, the table 400 may be stored within the database 132 accessible by the group control server 130. For embodiments where a master mobile communications device of the group initiates the group control, or where each of the mobile communications devices of the group independently implements the rules to collectively result in group control, then the information of the table may be stored and accessed within the mobile communications devices themselves. For actions to be taken that require mobile communications network implementation, then a mobile communications device that is implementing the rules itself, rather than relying on a group control server 130, may then send such instructions to the mobile communications network to request that such action be taken on its behalf, such as to forward to another phone number.

Figure 5:
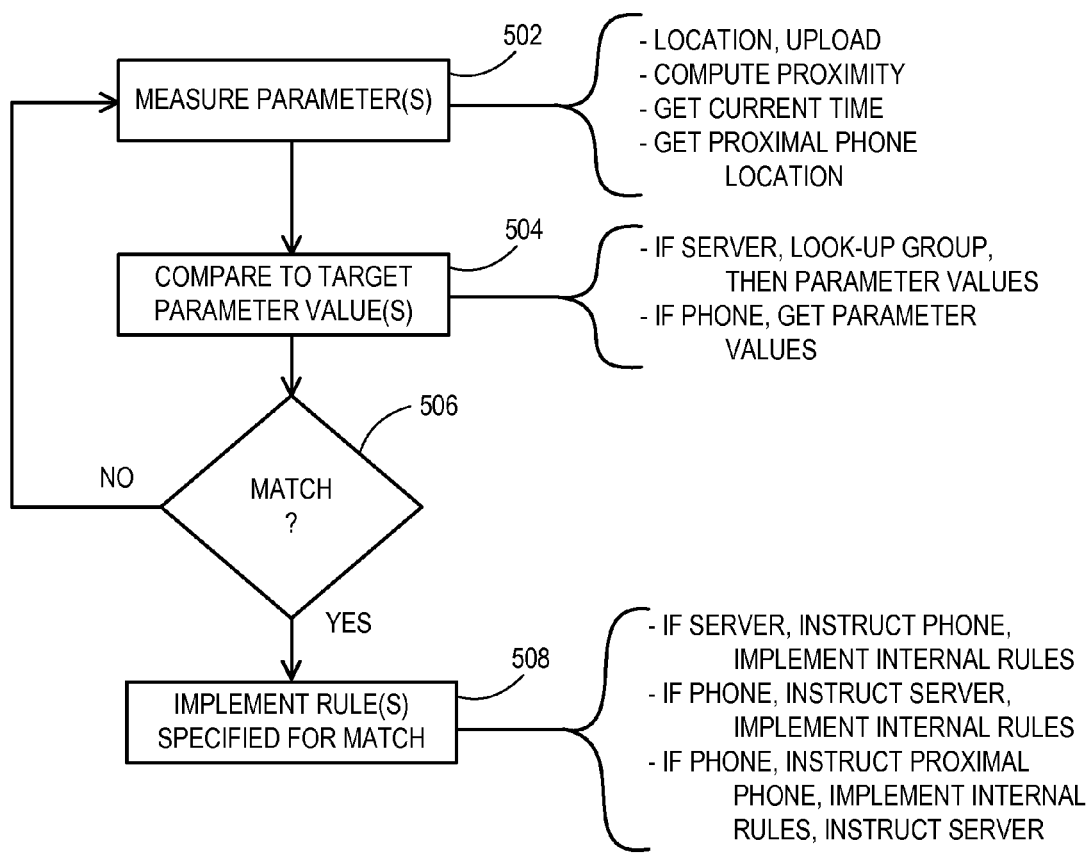
FIG. 5 shows an example of logical operations performed to implement rules of control modes for detected group settings.

FIG. 5 shows an example of logical operations that may be performed by a group control server 130 providing the group control service or by a mobile communications device 104 that is implementing the group control service itself. Initially, the parameters are measured at measurement operation 502. Here, the mobile communications device gets its location. Where the service is being provided by an external device, then the mobile communications device 104 may upload the location to the mobile communications network at least for the purpose of sharing the location with the group control server 130.

Depending upon the parameters specified for the group, either the mobile communications device or the group control server utilizes the current location of each of the mobile communications devices to prepare a comparison to the parameters specified for the group. For example, the proximity may be computed based on knowledge of the absolute location of each device. The group control server 130 is provided with that information. A master communications device of the group may also be provided that information for purposes of calculating proximity to group members. As an alternative, proximity to other devices of the group may be determined directly by the mobile communications devices themselves by utilizing short-range peer-to-peer communications to measure distance, for instance by using well-known ranging techniques with available short-range radio communications such as WiFi or Bluetooth. As another example, the current location may be compared to a geographical information system to determine whether the users are at a particular address.

Upon measuring the parameters, the data relevant to the group setting is then compared to the target parameter values specified for the group such as those of column 406 of FIG. 4 at comparison operation 504. Where the group control server 130 is implementing the service for the group, then the server looks-up the group in the table 400 and obtains the parameter values to perform the comparison. If the mobile communications device is implementing the service itself, then it obtains the parameter values from its own storage, from the mobile communications network, or from another external device where they may be stored.

At query operation 506, either the group control server 130 or the mobile communications device detects whether the data relevant to the group setting matches any of the group parameters that indicate a group setting exists. If not, the operations repeat by measuring parameters again, such as after a small delay. If the parameters do match, then the rules are implemented for the group setting at rules operation 508.

For implementation of the rules, if the group control server 130 is providing the service, then the server sends a command to each of the mobile communications devices within the group setting to implement the device actions. Such actions might include muting the ringer. The group control server then implements the other rules by commanding the mobile communications network to implement the internal rules. Such actions of the network might include forwarding incoming calls to voicemail or to a particular device.

If the mobile communications device is implementing the service or a portion of it such as the proximity detection, it may instruct the server 130 regarding a group setting existing so that the server may implement the internal rules and/or instruct other mobile communications device to implement rules. Alternatively, the mobile communications device may directly instruct other mobile communications devices of the group to implement the particular rules that are designated for them.

Thus, through the group-based control of mobile communications devices, the group setting may continue to co-exist with the presence of mobile communications devices of the group members. The mobile communications devices may introduce the amount of distraction, if any, that the administrator of the group has decided is allowable by configuring the rules to limit what behaviors of the mobile communications device remain active.

While embodiments have been particularly shown and described, it will be understood by those skilled in the art that various other changes in the form and details may be made therein without departing from the spirit and scope of the invention

What is claimed is:

1. A method of applying rules to predefined groups of mobile communications devices using a group control server, comprising:
   storing, at a database associated with the group control server, a group identifier corresponding to each predefined group of mobile communications devices;
   storing, at the database associated with the group control server, a mobile communications device identifier corresponding to each mobile communications device of each predefined group of mobile communications devices;

storing, at the database associated with the group control server, a parameter defining group settings particular to each group of the predefined groups of mobile communications devices;

storing, at the database associated with the group control server, a rule particular to each group of the predefined groups of mobile communications devices;

determining, utilizing the group control server, that a specific parameter stored at the database defining group settings particular to a specific predefined group of mobile communications devices of the predefined groups of mobile communications devices, has been met; and upon determining that the specific parameter defining group settings particular to the specific predefined group of mobile communications devices has been met, implementing a specific rule stored in the database particular to the specific group of mobile communications devices.

2. The method of claim 1, wherein:

storing, at the database associated with the group control server, the specific parameter defining group settings particular to the specific predefined group of mobile communication devices includes storing a specific time parameter and a specific proximity parameter, the specific proximity parameter defining a threshold proximity between mobile communication devices of the specific predefined group of mobile communications devices;

the method further includes receiving, at the group control server, location information for each mobile communications device of the specific predefined group of mobile communications devices;

determining, utilizing the group control server, that the specific parameter defining group settings particular to the specific predefined group of mobile communications devices, includes determining that the specific time parameter and the specific proximity parameter have been communications device of the specific predefined group of mobile met; and implementing the specific rule stored in the database particular to the specific predefined group of mobile communications devices includes implementing the rule upon determining that the specific time parameter and the specific proximity parameter have been met.

3. The method of claim 1, wherein:

storing, at the database associated with the group control server, the specific parameter defining group settings particular to the specific predefined group of mobile communication devices includes storing a specific location parameter in connection with the specific predefined group of mobile communications devices;

the method further includes receiving, at the group control server, location information for each mobile communications device of the specific predefined group of mobile communications devices;

determining, utilizing the group control server, that the specific parameter defining group settings particular to the specific predefined group of mobile communications devices, includes determining, utilizing the group control server and the location information for each mobile communications devices, that the specific location parameter has been met; and implementing the specific rule stored in the database particular to the specific predefined group of mobile communications devices includes implementing the rule upon determining that the specific location parameter has been met.

4. The method of claim 1, wherein:

storing, at the database associated with the group control server, the specific parameter defining group settings particular to the specific predefined group of mobile communication devices includes storing a specific time parameter;

determining, utilizing the group control server, that the specific parameter defining group settings particular to the specific predefined group of mobile communications devices, includes determining that the particular time parameter has been met; and implementing the specific rule stored in the database particular to the specific predefined group of mobile communications devices includes implementing the specific rule upon determining that the specific time parameter has been met.

5. The method of claim 4, wherein:

storing, at the database associated with the group control server, the specific parameter defining group settings particular to the specific predefined group of mobile communication devices includes storing a specific proximity parameter defining proximity between mobile communications devices of the specific predefined group of mobile communications devices;

the method further includes receiving, at the group control server, location information for each mobile communications device of the specific predefined group of mobile communications devices;

determining, utilizing the group control server, that the specific parameter defining group settings particular to the specific predefined group of mobile communications devices, includes determining, utilizing the group control server and the location information for each mobile communications device of the specific predefined group of mobile communications devices, that the specific proximity parameter has been met; and implementing the specific rule stored in the database particular to the specific predefined group of mobile communications devices includes implementing the rule upon determining that the specific proximity parameter has been met.

6. The method of claim 1, wherein the specific rule comprises directing calls designated for any mobile communications device of the specific predefined group of mobile communications devices to either;

a specified mobile communications device of the specific predefined group of mobile communications devices;

a specified number: or a specified voice mailbox.

7. The method of claim 1, wherein the specific rule comprises muting the ringer of each mobile communications device of the specific group of mobile communications devices.

8. The method of claim 1, wherein:

the specific rule comprises a first rule and an exception rule, the exception rule preventing the first rule from being implemented; and implementing the specific rule for the mobile communications devices comprises determining, at the group control server, whether the exception rule applies to the specific group of mobile communications devices, and implementing the exception rule if the exception rule applies.

9. A group control server comprising:

a processor;

a computer readable medium in communication with the processor, the computer readable medium containing instructions causing the processor to perform acts comprising:

determining whether a parameter related to a predefined group of mobile communications devices falls within a predefined threshold that defines a grouping of the mobile communication devices of the predefined group of mobile communications devices; and if the parameter falls within the threshold, then implementing at least one rule defined for the group mobile communications devices.

10. The group control server of claim 9, wherein:

the parameter comprises physical locations of the mobile communications devices of the predefined group of mobile communication devices; and the threshold comprises a distance from the physical location of the mobile communications devices to a predefined physical location defined for the predefined group of mobile communication devices.

11. The group control server of claim 9, wherein the parameter comprises a proximity of the mobile communications devices of the predefined group of mobile communication devices to each other.

12. The group control server of claim 9, wherein:

the parameter comprises a current time; and the threshold comprises a start time for implementing the at least one rule for the predefined group of mobile communications devices.

13. The group control server of claim 9, wherein the at least one rule comprises muting a ringer of at least one mobile communications device of the predefined group of mobile communications devices.

14. The group control server of claim 9, wherein the at least one rule comprises forwarding at least some incoming calls to a redefined number designated for the group.

15. A master mobile communications device, comprising:

a transceiver for communicating with a mobile communications network;

a memory storing:

a parameter associated with a specific predefined group of mobile communication devices including the master mobile communications device; and a rule defining an action to take with respect to incoming calls intended for one of the mobile communications devices of the predefined group of mobile communications devices if the parameter is met; and a processor configured to send and receive calls via the transceiver, to determine the parameter, and to implement the action to take in relation to incoming calls intended for one of the mobile communications device of the predefined group of mobile communications devices based on the determined parameter; and computer readable instructions that, when executed by the processor, cause the processor to:

determine that the parameter stored in the memo has been met; and upon determining that the parameter for the specific predefined group of mobile communications devices has been met, implement the rule.

16. The master mobile communications device of claim 15, wherein the rule includes muting the ringer of each mobile communications device of the predefined group of mobile communications devices.

17. The master mobile communications device of claim 15, wherein the instructions regarding the rule include an action of sending an instruction to the mobile communications network to forward at least some incoming calls intended for a mobile communications device of the predefined group of mobile communications devices to a designated number.

18. The master mobile communications device of claim 15, wherein the instructions regarding the rule include an action of disabling at least one of the mobile communications devices of the group of mobile communications device from making outbound calls.

19. The master mobile communications device of claim 15, wherein the parameter associated with the specific predefined group includes at least one parameter selected from a group of parameters consisting of:

a time parameter;

a location parameter; and a proximity parameter.

20. The master mobile communications device of claim 15, wherein the processor is further configured to determine a current time, wherein the parameter comprises a time span for group actions, and wherein the processor implements the actions if the current time falls within the time span for group action.

* * * * *